Dec. 23, 1952  C. M. MUIR  2,622,932
WHEEL MOUNTING
Filed June 5, 1950

CHARLES M. MUIR
Inventor
Geo E Kirk
Atty.

Patented Dec. 23, 1952

2,622,932

UNITED STATES PATENT OFFICE 2,622,932

WHEEL MOUNTING

Charles M. Muir, Toledo, Ohio

Application June 5, 1950, Serial No. 166,160

2 Claims. (Cl. 301—9)

This invention relates to structures for ready assembly and disconnection of units as to coaxial relation against relative angular shifting.

This invention has utility as between a rotatable shaft, a sleeve, axle, hub and the like and a pulley, gear and a road wheel. More particular advantage arises in the removal of road wheels for motor vehicles, which may be effected quickly, independently of tools. The chauffeur or vehicle driver may quickly take-off a vehicle wheel, especially in instances of trouble, and replace as readily by a spare. An instance of embodiment has to do with providing the support of axle region with an annular group of lugs, having overhang in one direction as from a radially extending disk face. The central region of a wheel disk, about its axial opening has a series of openings or ports adapted to register with the lugs, take a slight angular shift, with the opening clearances as to the lugs now filled by locking ring blocks. The ring is adapted for spring pin assembly at the locking position.

Referring to the drawings.

Figure 1:
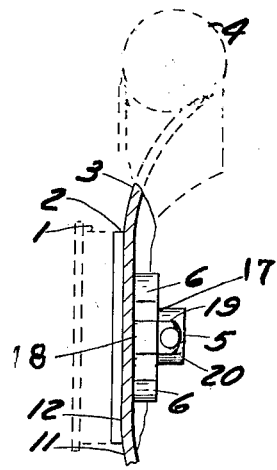
Fig. 1 is an edge view of the attachment assembly, say looking from the rear toward a right hand side road wheel, mostly broken away or in dotted showing, with a fragment of the wheel disk central portion in section in the region of the axle.
Figure 2:
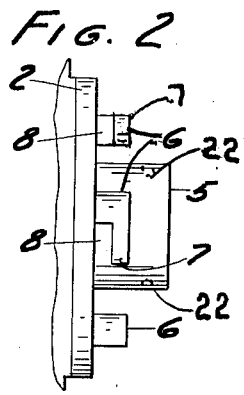
Fig. 2 is an edge view of the lug-carrying axle region.
Figure 3:
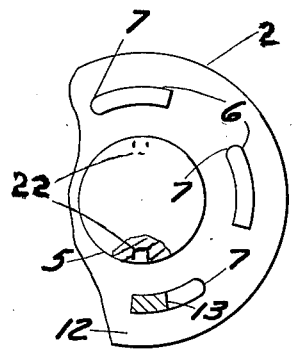
Fig. 3 is a partial view looking from the right of Fig. 2.
Figure 4:
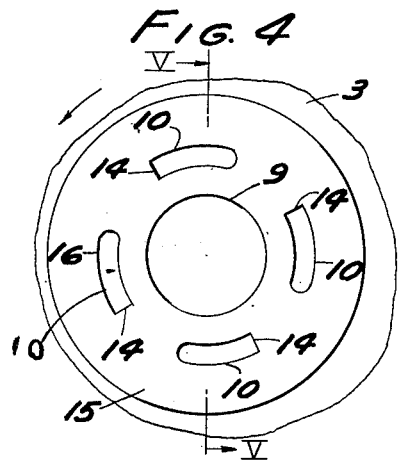
Fig. 4 is a side elevation of the central region of the wheel disk.
Figure 5:
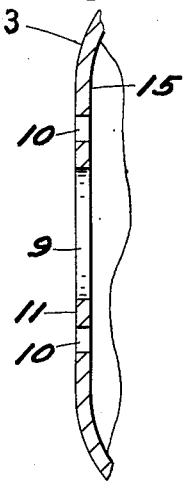
Fig. 5 is a section on the line V—V, Fig. 4.
Figure 6:
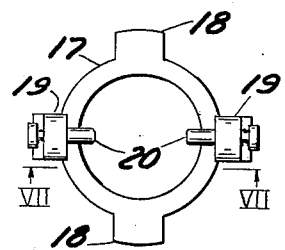
Fig. 6 is a side elevation of the locking ring to seat in the disk.
Figure 8:
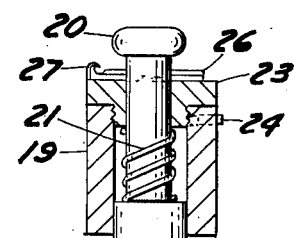
Fig. 8 is a detail view, in section as to the mounting, of one of the pair of assembly maintenance pins for the locking ring, the showing being on an enlarged scale.
Figure 7:
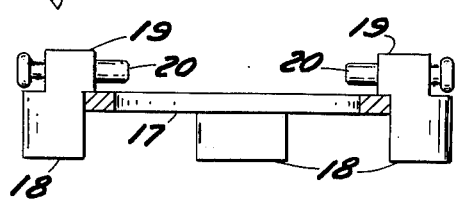
Fig. 7 is an enlarged view of the ring from the line VII—VII, Fig. 6.

For a motor vehicle of the automobile type, having a brake drum 1 at a hub plate region 2, there is to be located a wheel disk 3 for a pneumatic tire 4. A stub axle 5 is shown protruding from the plate 2 coaxially of the disk 3 and the tire 4.

Under the invention herein, there is located concentric of the axle 5 to protrude from the plate 2 a plurality of hook lugs 6. In a common, say follower side direction, each lug 6 has an arc-shaped overhang 7 as to a seat 8.

The disk 3 about its axial opening 9 has an annular series of arc-shaped slots or ports 10. The disk 3 is, accordingly, adapted to be thrust on the axle 5, for the hook lugs 6 to register with the ports 10. The disk 3 has its inner face 11 abut the outer face 12 of the plate 2, at which position there may be a counterclockwise relative shifting of the disk 3 as to the plate 2 to bring a straight radial lug side 13 in the port 10 against straight radial port end 14. There is thus established thruout the annular series of lugs and ports an abutting angular stop assembly of the seats 8 with the overhangs 7 snugly against disk 3 outer face 15.

A clearance 16 is thus left in each port 10 aft the lug 6. Over the axle 5 is now thrust a locking ring 17 having an annular series of block offsets 18 to seat in each clearance 16 in such snug coaction as to hold the radial sides 13, 14, abutting. Rising from a plurality of the block regions of the ring 17 is a slide guide 19 for a spring pin 20, yieldably inwardly thrust by a helical compression spring 21 to ride in a registering port 22 of the axle 5. A bushing 23 on the pin 20 before the head is mounted on the pin, has thread assembly with the guide 19 to locate the spring in position. A set screw 24 locks the bushing 23 with the guide 19. A key 26 radially slidable thru the pin 20 on the outer face of the bushing 23, rides under an overhang or hook 27, to lock the pin 20 in the axle seat or port 22 against being thrown out by centrifugal force in high speed rotation.

Considerable advantage ensues in carrying thru the subject-matter of the invention as herein disclosed. In the event there be road mishap, remote from access to tools, there is of course requirement to provide axle support to clear the wheel from the road. However, from here on, the driver with only hands, may pull the pins 20 thereby clearing the locking ring 17 for take-off, or at least getting the blocks 18 away from the clearances 16. From the held axle, it is now only necessary to give the wheel but a slight rock to move the lugs 6 back into the clearances 16. The axial direction lock between the axle and the wheel is now released by the overhang portion 7 of the lugs 6 being retracted from riding over the face 15 of the disk 3. The lugs 6 are now in axial register with the ports 10 and it is only necessary for the driver to complete the uncoupling by now pulling the wheel off in a direction away from the plate 2.

The remount, that is, placing of the spare, is speedily effected in the reverse sequence.

The seat means 9 is slid over the coaxial seat means 5 with angular positioning to locate the ports 10, so that completion of the thrust of the disk side 11 is to abut the plate side 12. The bayonet joint series in a radial plane is now at an assembly stage. Angular shifting now causes the overhangs 7 of the hook lugs 6 to ride on the disk face 15 to lock axially the disk face 11 in abutting relation with the plate face 12. This shifting limit is with the lug seat face 13 against the port end face 14. Considering it one movement to bring the ports 10 into register with the lugs 6 and have the disk and plate members abut, the second movement is the few degrees in angular shift for setting the bayonet joint. There is now the third movement, to apply the locking ring 17 for its blocks 18 to enter the clearances 16, and as this is being done, the spring pins 20 enter the axle stub seats 22. Precautionary setting may now be taken thru having the key 26 under the hook 27. The spare is now fully placed for safe driving, preferably thru the lugs away from the clearances, altho the blocks 18 effectively respond in reverse direction transmission.

What is claimed and it is desired to secure by Letters Patent is:

1. An automobile demountable wheel assembly on a plate-providing axle, said plate having an axle stub protruding therefrom and an annular series of hook lugs thereabout, said wheel including a disk region providing a complementary series of ports to register with the lugs and, at relative angular shifting, to anchor axially the wheel with the axle and in said shifting to expose clearance at the ports adjacent the lugs, a ring adapted to be thrust over the axle stub against the plate, said ring having blocks coacting at plate contacting position of the ring to seat in the port clearances directly to laterally abut lugs shifted from such clearance portions of the ports and thereby lock the wheel against angular shifting relatively to the axle plate, and spring pin means coacting between the ring and axle stub to hold the ring with its blocks in wheel mounting assembly.

2. A demount coupling for an automobile wheel, said coupling comprising a pair of opposing plate members, one member providing an annular series of ports and the other member a complementary concentric annular series of lugs coacting in assembly to provide bayonet joints, a locking ring having an annular series of wedges insertable in the ports against the lugs to lock the plate members assembled by the bayonet joints, and radially extending spring pins carried by the ring, one of said members having seats for the respective pins thereby to hold the ring with the wedges in the ports in maintaining the joints in locked positions.

CHARLES M. MUIR.

REFERENCES CITED

The following references are of record in the file of this patent:

UNITED STATES PATENTS

| Number | Name | Date |
|---|---|---|
| 2,008,330 | McGuigan | July 16, 1936 |
| 2,077,567 | Orr | Apr. 20, 1937 |
| 2,246,009 | Rosen | June 17, 1941 |
| 2,489,179 | Hartman | Nov. 22, 1949 |

FOREIGN PATENTS

| Number | Country | Date |
|---|---|---|
| 630,990 | Germany | June 10, 1936 |